No. 840,731. PATENTED JAN. 8, 1907.
A. W. WIGGLESWORTH.
CHANGE SPEED GEAR.
APPLICATION FILED NOV. 28, 1904.

Witnesses:
Inventor:
Albert W. Wigglesworth
by Poole Brown
Attys.

No. 840,731. PATENTED JAN. 8, 1907.
A. W. WIGGLESWORTH.
CHANGE SPEED GEAR.
APPLICATION FILED NOV. 28, 1904.

Witnesses:

Inventor:
Albert W. Wigglesworth
by Poole Brown
his Attys

No. 840,731. PATENTED JAN. 8, 1907.
A. W. WIGGLESWORTH.
CHANGE SPEED GEAR.
APPLICATION FILED NOV. 28, 1904.

UNITED STATES PATENT OFFICE.

ALBERT W. WIGGLESWORTH, OF CHICAGO, ILLINOIS.

CHANGE-SPEED GEAR.

No. 840,731. Specification of Letters Patent. Patented Jan. 8, 1907.

Application filed November 28, 1904. Serial No. 234,613.

*To all whom it may concern:*

Be it known that I, ALBERT W. WIGGLESWORTH, a citizen of the United States, residing at Chicago, in the county of Cook and State of Illinois, have invented certain new and useful Improvements in Change-Speed Gear; and I do hereby declare that the following is a full, clear, and exact description thereof, reference being had to the accompanying drawings, and to the letters of reference marked thereon, which form a part of this specification.

This invention relates to improvements in change-speed gears designed to be interposed between a driving part having a constant speed and a driven part the speed of which is adapted to be varied; and the invention consists in the matters hereinafter set forth, and more particularly pointed out in the appended claims.

Among the objects of my invention is to provide an extremely compact device of this character which may be installed in a small space and which is so constructed as to effect a wide variation of the speed imparted to the driven part from the constant-speed driving part.

A further object of my invention is to improve the general and detail structural features of a change-speed gear of this type.

I have herein shown my improved speed-change gear as applied to a drilling-machine, it being operatively interposed between the main driving-shaft of said machine and the drill-spindle. The construction and arrangement of my improved device lends itself peculiarly to use on a drill of this character, inasmuch as the same occupies but little space, possesses great strength to transmit ample power, and is capable of being supported on the main standard of the drill. It is to be understood, however, that the application of my speed-change gear is not limited to any particular mechanism the speed of which it is designed to vary.

As shown in the drawings, A designates the upright standard of a drill of the type known as a "radial" drill, and A' the radial arm thereof, which supports the drill mechanism $A^2$. The power is applied to said drilling-machine through the medium of fast and loose pulleys B on a short shaft $b$ at the foot of the standard, which operates through a pulley or drum B', a belt $b'$, and a pulley C to drive the main driving-shaft C' of the gear. D is a counter-shaft, between which and the main shaft is interposed my improved change-speed device, whereby the speed of the counter-shaft is varied within defined limits. The counter-shaft D is provided outside the casing inclosing the gear with a pinion $d$, which meshes with a pinion $e$ of a shaft E, which latter is geared to a horizontal shaft F, that is operatively geared to the drill-spindle. These parts of the mechanism are illustrated merely to indicate one useful mode of application of my invention.

When my improved change-speed gear is employed in connection with a drill of this character, it is mounted on the upper end of the standard A and is inclosed in a suitable casing G, the lower flanged wall of which is bolted to the upper end of the standard. As herein shown, said lower wall, the front and rear and side walls of the casing G are made integral with each other, while the top wall $g$ is removable in order to afford access to the interior of the casing or chamber for the purpose of installing, removing, and adjusting the essential elements of the change-speed gear, which will now be described.

Figure 3:
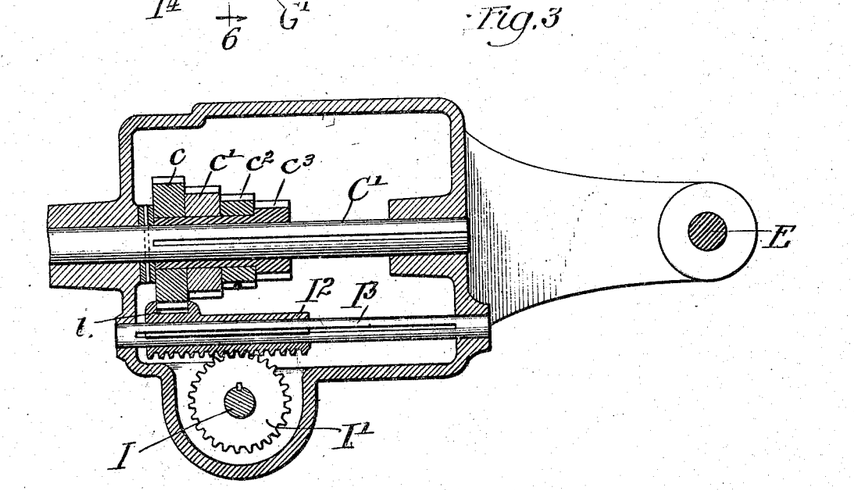
Fig. 3 is a horizontal section showing the main driving-shaft of the gear, the parts of the gear carried thereby, and the means for shifting the parts of the gear on the shaft to produce variation of speed.
Figure 4:
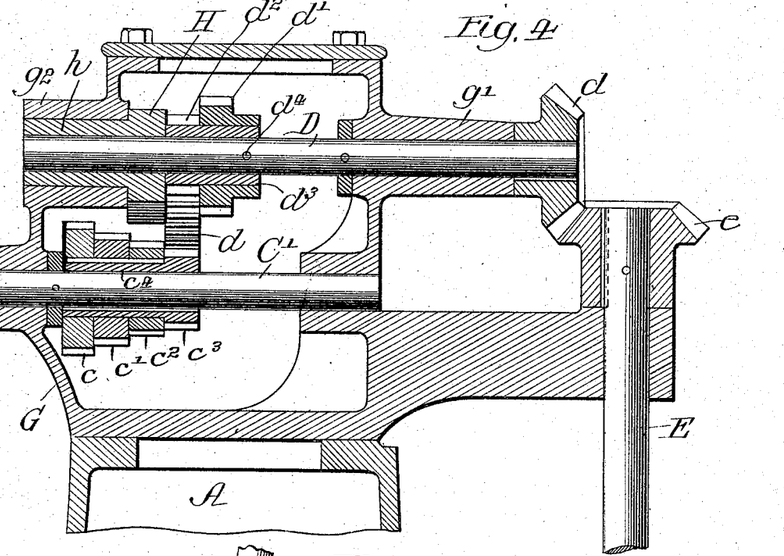
Fig. 4 is a vertical section of the essential parts of a speed-change gear, taken on a plane through the axis of the main and counter shafts of the gear.

The main shaft of the gear, which in this instance consists of the shaft C', is mounted in suitable bearings in the side walls of the casing, as shown in Figs. 3 and 4. Affixed to said main driving-shaft are a series of gear-wheels $c$ $c'$ $c^2$ $c^3$, arranged side by side and made progressively smaller and which for convenience of designation may be termed "cone-gears." Said gears are fixed to and rotate with the main shaft C'. As a matter of convenience in mounting the gears on the shaft the smaller gear $c^3$ is formed with an integral collar or sleeve $c^4$, that fits closely about and is keyed to the shaft, and the other gears $c$ $c'$ $c^2$ fit tightly on said sleeve $c^4$ and are keyed or otherwise non-rotatively fixed thereto, Fig. 4. If desired, the gears may be formed one integral part. The power transmitted through the gear at any given time is transmitted through a single one of the cone-gears $c$ $c'$ $c^2$ $c^3$ of a given diameter for each speed. Said group or series of gear-wheels are adapted to be moved collectively endwise of the shaft by means hereinafter described for the purpose of presenting different ones of the gears to the coacting gears of the device hereinafter to be described, and thereby vary the speed of the counter-shaft D and the part driven thereby. Said counter-shaft is mounted in the casing parallel with the main shaft C' and vertically above the same, as herein shown. Said counter-shaft is mounted at its end adjacent to the gear-wheel $d$ in an elongated sleeve or bearing $g'$ of the casing. The other end of said shaft is mounted in a sleeve or bearing $h$, extending outwardly from a rocker-arm H, hereinafter to be described, the rocker-arm sleeve fitting closely within and having rotative bearing with an extension sleeve or bearing $g^2$ of the casing. It will thus be seen that the bearing for the rocker-arm is independent of the shaft D, the bearing for the rocker-arm being stationary with the casing or support. Therefore the strain placed on the intermeshing gears of the rocker-arm and the arm has no tendency to place a bending stress on the shaft D, particularly when the rocker-arm is immovable endwise of the shaft. Mounted on said counter-shaft in addition to the rocker-arm H are two gear-wheels $d'$ $d^2$, the former of which is made of greater diameter than the latter. The said gear-wheels are fixed from rotative and endwise movement on said shaft. As a matter of convenience the said gear-wheel $d^2$ is formed integral with a sleeve $d^3$, which surrounds the shaft and is secured thereto by a pin $d^4$, and the wheel $d'$ surrounds and is non-rotatively fixed to the sleeve by the same pin $d^4$.

Figure 2:
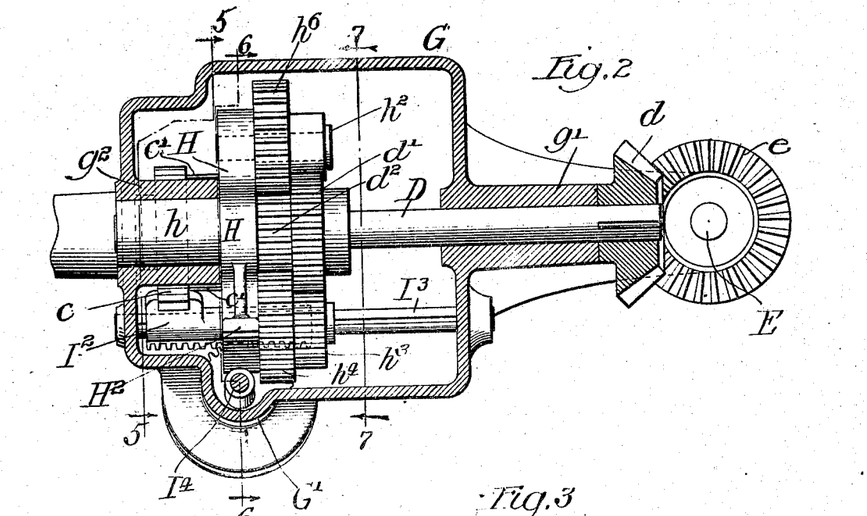
Fig. 2 is a horizontal section of a speed-change gear, showing the casing in section and the principal parts of the gear in elevation.

The rocker-arm H is located between said sleeve $d^3$ and the adjacent side wall of the casing and is adapted to oscillate vertically about said counter-shaft as a pivot. The rocker-arm and its bearing $h$ are thus held in proper bearing with relation to the casing or support, thus maintaining the bearing stress of the rocker-arm sleeve always in the casing and independent of the shaft D. Said rocker-arm is indicated more clearly in Figs. 2, 5, and 6. The rocker-arm carries at its end studs $h'$ $h^2$, upon the former of which is mounted a double gear-wheel $h^3$ $h^4$, Figs. 2, 5, and 7, and upon the latter of which is mounted a single gear-wheel $h^5$. The said gear-wheel $h^5$ is located in alinement and is in constant mesh with the gear-wheel $d^2$ of the counter-shaft and is adapted, when the rocker-arm is swung in the proper direction, to be lowered into mesh with one of the gear-wheels $c$ $c'$ $c^2$ $c^3$, depending upon the longitudinal location of said group of wheels on the main shaft. Inasmuch as the rocker-arm swings in its own bearing in the support or casing about the axis of the counter-shaft said wheel $h^5$ is not thrown out of mesh with its mating wheel $d^2$ when brought into mesh with one of the wheels $c$ $c'$ $c^2$ $c^3$. The larger gear-wheel $h^4$ at the other end of the rocker-arm is likewise adapted to be brought into mesh with one of the series of gear-wheels $c$ $c'$ $c^2$ $c^3$ when the rocker-arm is swung in the proper direction. Said gear-wheel $h^4$ does not, however, mesh with the corresponding gear-wheel $d'$ on the counter-shaft; but said wheel $d'$ is in constant meshing engagement with the smaller gear-wheel $h^3$, which is integral or rotates with the larger gear-wheel $h^4$. In other words, while the gear-wheel $h^4$ is adapted for intermittent meshing engagement severally with the gear-wheels $c$ $c'$ $c^2$ $c^3$ the gear-wheel $h^3$ is constantly in mesh with its mating wheel $d'$. It will thus be observed that power may be transmitted from the main shaft through either of its gear-wheels to the counter-shaft directly through the gear-wheel $h^5$ and its mating gear-wheel $d^2$ on the counter-shaft when the rocker-arm is swung to one limit of its movement and may be transmitted from either of said gear-wheels to the counter-shaft through the gear-wheels $h^4$ and $h^3$ and the wheel $d'$ on the counter-shaft meshing with the gear-wheel $h^3$ when the rocker-arm is at the other extremity of its movement. Thus it will be seen that the coöperation of the four gears $c$ $c'$ $c^2$ $c^3$ with two sets of transmitting idler-gears arranged and proportioned as shown produces different speeds, and the proportion of the gears is such that the increase of speed from the lowest to the highest is graduated so as to produce a substantially uniform degree of increase. It will be furthermore observed that the varied-diameter gears are arranged face to face or grouped closely together (or the gear-faces thereof may be made on an integral-stepped casting) and also that the larger gear-wheels $h^4$ $h^5$ of the rocker-arm are in line with each other, so that two different speeds, whose ratio depend upon the proportions of the gears $h^3$ $h^4$, may be obtained in one adjustment of the gears $c$ to $c^3$, inclusive, by swinging the rocker-arm to bring the gear-wheels $h^4$ $h^5$ thereof alternately into mesh with one of said varied-diameter wheels $c$ to $c^3$, inclusive. This arrangement contributes to the compactness of the device.

Any suitable means may be employed for rocking the rocker-arm on its axis of oscillation to alternately bring the gear-wheels $h^4$ $h^5$ carried thereby into mesh with one of the gear-wheels $c$ $c'$ $c^2$ $c^3$ of the main-shaft group and for locking the rocker-arm in such position, and other suitable means may be employed for shifting said group or series of wheels endwise of the main shaft, so that said wheels $h^4$ $h^5$ may be brought into mesh with either of said rocker-arm gear-wheels, as described.

Before describing in detail the means herein shown for effecting the swinging of said rocker-arm and longitudinal movement of said group or series of gear-wheels referred to I will describe somewhat in detail the operation of the essential parts of the change-speed gear the construction of which has been thus far referred to and described.

Figure 6:
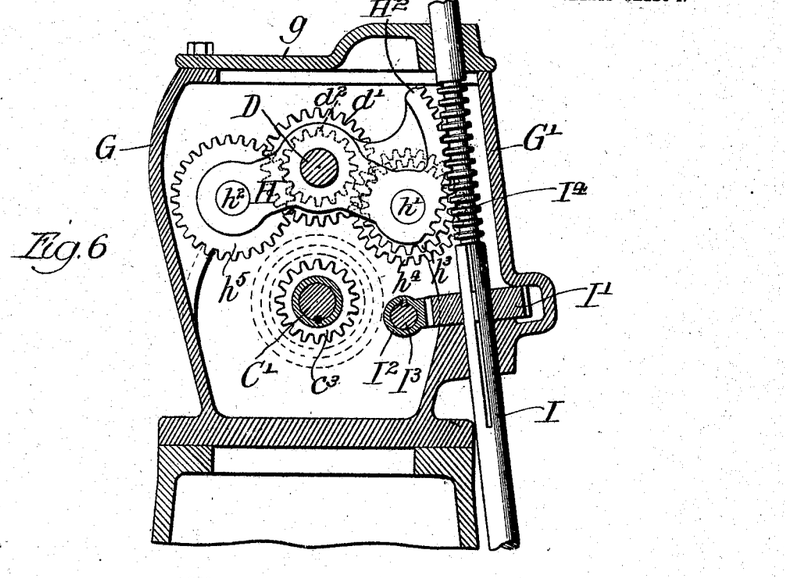
Fig. 6 is a vertical section taken on line 6 6 of Fig. 2 looking in the direction indicated by the arrows.
Figure 7:
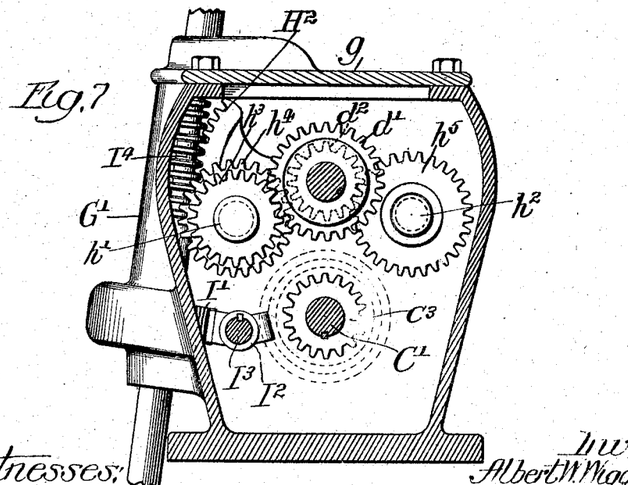
Fig. 7 is a vertical section taken on line 7 7 of Fig. 2 looking in the direction indicated by the arrows.
Figure 8:
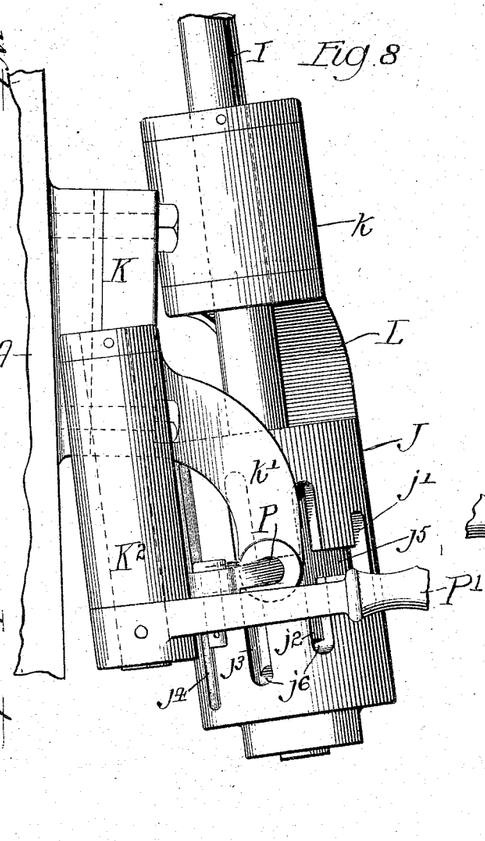
Figs. 8 to 11, inclusive, are details illustrating the devices by which the operative parts of the gear are manually controlled for changing the adjustment thereof.

The rocker-arm H is shown in Figs. 6 and 7 in the inoperative or intermediate part of its throw, Fig. 6 illustrating said arm from one side of the group of gears and Fig. 7 the arm from the other side thereof.

Figure 5:
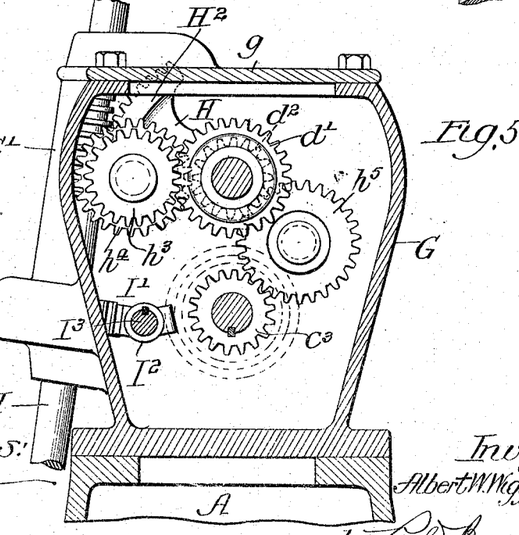
Fig. 5 is a vertical section taken on the indirect line 5 5 of Fig. 2, showing some of the parts in changed positions.

Fig. 5 illustrates the arm tilted or oscillated on its axis in a manner to bring the gear-wheel $h^5$ into mesh with one of the gears of the main shaft, the gear $c^3$ as herein shown. In such position of the parts power is transmitted from the main shaft through the intermediate or idle gear $h^5$ on one end of the rocker-arm and through the intermeshing or mating gear-wheel $d^2$ on the counter-shaft, thereby rotating said counter-shaft at a speed determined by the proportionate sizes of the gears $c^3$, $h^5$, and $d^2$. Four different speeds may be produced when the rocker-arm is tilted to the position shown in Fig. 5 by bringing the gear-wheel $h^5$ severally into mesh with the four different gear-wheels $c'$ $c^2$ $c^3$ $c$ of the main shaft. When the speed is to be changed from a smaller to a larger gear, the rocker-arm is thrown upwardly to move the idler-gear $h^5$ out of the path or movement of the group of wheels $c$ to $c^3$, inclusive. Thereafter the said group of wheels are shifted endwise of the main shaft to bring one of the larger wheels into line with said idler $h^5$, and thereafter the rocker-arm is tilted to bring the idler into mesh with such alined wheel. In this manner the idler $h^5$ may be brought into mesh one at a time with all of the gears $c$ to $c^3$ on the main shaft, thereby effecting different speeds through such adjustment. After the variation of speed is exhausted by meshing of the idler $h^5$ with each of the gear-wheels $c$ to $c^3$ on the main shaft four other speeds may be produced by tilting the rocker-arm at an inclination the reverse of that shown in Fig. 5, and thereby bring the gear-wheel $h^4$ into meshing engagement severally with the gear-wheels $c$ $c'$ $c^2$ $c^3$, while the gear-wheel $h^3$ is maintained in constant mesh with its mating gear-wheel $d'$. The slowest speed of the gear is that produced when the idler $h^5$ is in mesh with the smaller gear $c^3$ of the group of main shaft-gears and also in mesh with the gear $d'$ of the counter-shaft, and the speed of the counter-shaft is gradullly increased as said gear $h^4$ is brought successively in mesh with the next larger gears $c^2$ $c'$ $c$, respectively. After the highest speed of the gear has been attained with the adjustment shown in Fig. 5 the rocker-arm is then tilted to the reverse inclination, so as to bring the gear $h^4$ in position for meshing with one of the gears $c$ to $c^3$, inclusive. The lowest speed of the gear with the rocker-arm in a position reverse of that shown in Fig. 5 is at a time when the gear $h^4$ is engaged with the smallest main-shaft gear $c^3$ and the graduation of speed is effected by shifting the larger gears $c$ to $c^2$, inclusive, successively in mesh with the gear $h^4$.

By preference the varied-diameter or cone gears are shifted endwise of the shaft C' instead of shifting the rocker-arm and the gears carried thereby together with the gears carried by the shaft D, inasmuch as the former or cone gears may be much more readily adjusted than the latter for the purpose of varying the speed of the driven shaft. By reason of the fact that the gears $c$ to $c^3$, inclusive, are grouped closely together it is only necessary to shift the said varied-diameter gears a distance corresponding to the thickness of three of the gear-faces thereof. Thus the shaft carrying said gears may be made short and stiff without being made unduly heavy, while providing ample space for the proper endwise shifting of the varied-diameter or cone gears thereon. This construction, taken in connection with the rocker-arm described, which has bearing in the casing or support independently of the upper or counter shaft D, produces an exceedingly strong and compact construction and one which is capable of transmitting high speed and for transmitting power for heavy work.

The proportions of the gears are such as to produce a practically uniform ratio of increase of speed of the counter-shaft with a constant speed of the main shaft by operating the gear-wheels in the manner described. Any suitable means may be employed for swinging said rocker-arm on its axis to bring either one or the other of its idler-gears into mesh with the gears on the main shaft and also for shifting said gears on the main shaft successively into line with the idler-gears of said rocker-arm.

Figure 1:
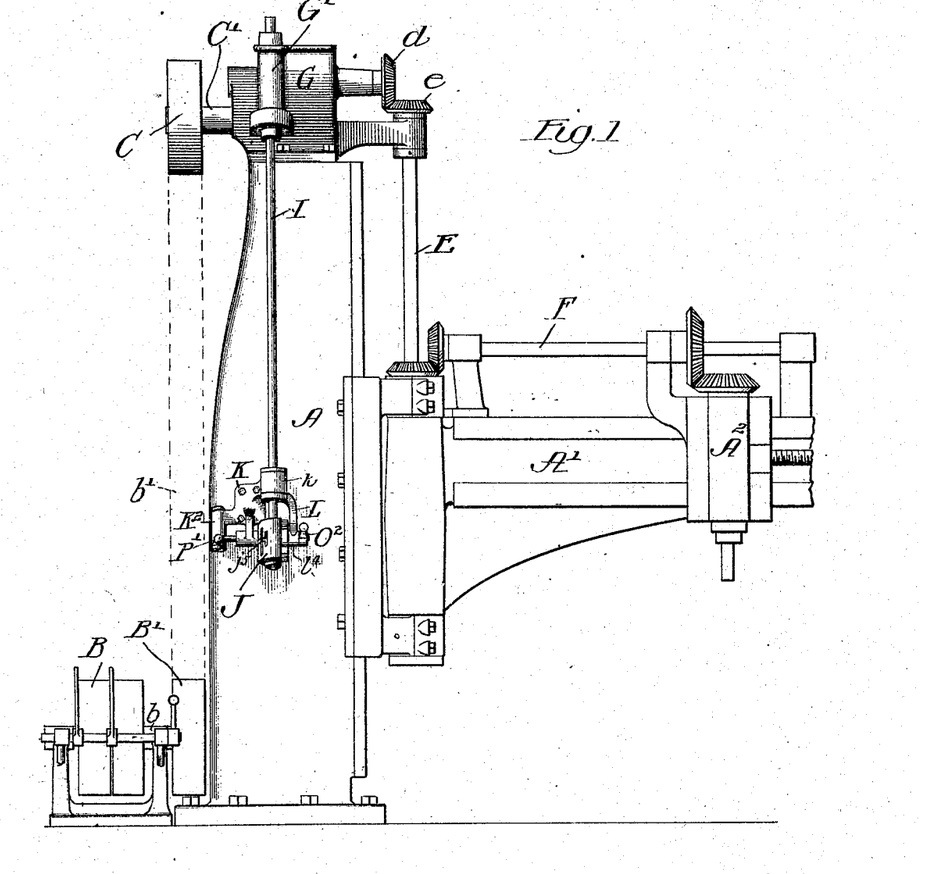
Figure 1 is a front elevation of a radial drilling-machine, showing my invention applied thereto.

As a further and separate improvement I have provided means actuated by a singly manually operable part to perform the two functions referred to—to wit, tilting said rocker-arm on its axis and shifting the main driving-gears successively into line with the idlers carried by the rocker-arm. The construction herein shown for effecting this result is made as follows: I designates a shaft which extends upwardly through the casing at one side thereof, the casing being enlarged or extended at G', Figs. 1, 6, and 7, to receive the same. Said shaft has rotative bearing in the upper and lower walls of the extended part thereof and has a limited rotation thereon. I' designates a gear-wheel which is fixed to said shaft I within the casing by means permitting the shaft to slide thereof, but is non-rotative on the shaft. Said gear-wheel I' meshes with a rack formed on a sleeve $I^2$, which surrounds and slides endwise on a shaft $I^3$, that extends across the casing G, parallel with and slightly below the main shaft of the device. Said rack-sleeve has interlocking connection with the group of gears $c$ to $c^3$, inclusive, whereby when the sleeve is moved endwise said gears are moved endwise to a like extent. As herein shown, one end of the sleeve is provided with a notch $i$, formed to receive, as herein shown, the larger gear-wheel $c$ of said group. The geared periphery of said wheel $c$ is free to rotate in said notch, and the side walls of the notch overlap the wheel sufficiently to effect an interlocking engagement between the parts, whereby when the sleeve $I^2$ is shifted endwise on its shaft the group of gears $c$ to $c^3$ are likewise shifted endwise on the main shaft. Such shifting of the gears is effected in order to bring the several gears in line with the idler-gears $h^4$ $h^5$, as before stated. Rotation of said shaft I and gear-wheel I' thereon produces such endwise movement of the rack-sleeve and interlocked group of gears. Means are associated with said shaft I which act during endwise movement of the said shaft to swing the rocker-arm on the countershaft D, and thereby at the proper time to bring either of the idler-gears $h^4$ $h^5$ in mesh with one of the gears $c$ to $c^3$, inclusive. This result is effected in the present instance by means of the following mechanism: The shaft I is provided above the gear-wheel I' with a circular rack $I^4$, herein shown as formed integral with the shaft by providing the shaft with a plurality of alternate annular grooves and ribs. Said circular rack meshes with a curved segmental rack $H^2$, formed at one end of the rocker-arm H. The formation of the teeth of the circular rack $I^4$ permits the shaft I to be rotated in order to operate the rack-sleeve $I^2$ through the medium of the gear-wheel I' and at the same time serves as a rack the endwise movement of which effects the tilting of the rocker-arm in the manner described. If it is desired to change the adjustment of said speed-gear at time when the rocker-arm is in its intermediate position, the shaft I is first rotated on its axis to bring the proper gear-wheels $c$ to $c^3$, inclusive, in line with one of the gear-wheels $h^4$ $h^5$ of said arm, and thereafter the shaft is shifted endwise in the proper direction to swing the rocker-arm on its axis to bring one of the idler-gears in mesh with one of said gear-wheels $c$ to $c^3$.

Figure 9:
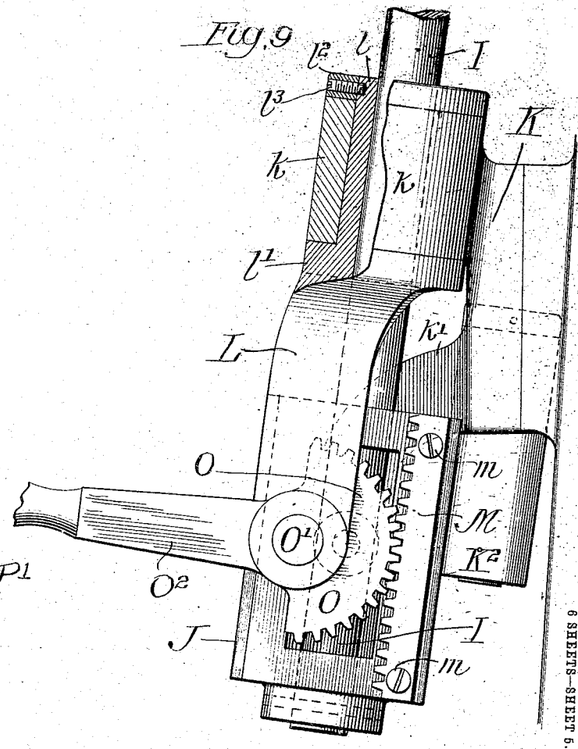
Figures 10, 11:
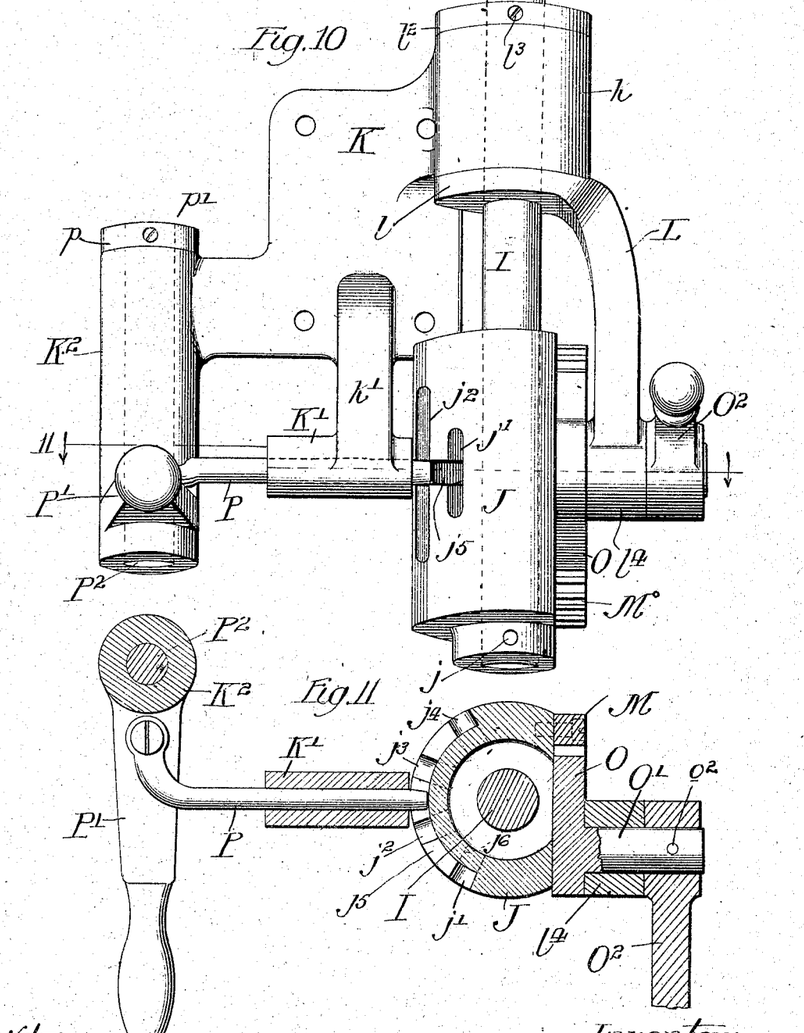

Any suitable means may be employed for manually operating the shaft I to rotate the same and move it endwise in the manner described and for locking the shaft and actuated parts in an adjusted position. The means herein shown are illustrated more clearly in Figs. 1, 8, 9, 10, and 11 of the drawings and are made as follows: The lower end of the shaft I is fitted with a head, (designated as a whole by J,) said head being fixed to the shaft by means of a pin $j$, extending through the lower end of the shaft and head. The head, as herein shown, is made generally cylindric and is capable both of a vertical and a limited rotative movement. The shaft I has bearing above the head in a suitable bearing-sleeve $k$ of a bracket K, attached to the standard A of the drilling-machine. The shaft itself does not directly engage the bearing-sleeve $k$, but is contained within a bushing $l$, formed on the upper end of a hanger or bracket L, depending laterally and downwardly from the bushing. The lower end of the bushing is provided with a flange $l'$, from which the hanger L springs, and the upper end of the bushing is provided with a detachable ring engaging the upper end of the bearing-sleeve $k$ and is herein shown as attached to the bushing by means of a set-screw $l^3$, by which the bushing and hanger are held in place. Said head J is provided at one side thereof with a rack-bar M, Figs. 9 and 11, attached thereto by screws $m$. The teeth of said rack-bar are adapted for engagement by the teeth of a segment O, that is fixed to or formed on a laterally-directed shaft O', that has bearing in a sleeve $l^4$ at the lower end of the bracket L. Affixed to the end of said shaft O', laterally outside of its bearing in the sleeve $l^4$, is a lever $O^2$, herein shown as attached thereto by means of a pin $o^2$. With this construction it will be seen that by swinging the lever $O^2$ vertically it acts through the gear wheel or segment O and rack M to raise and lower the head J and the shaft I, which movement of the shaft serves to swing the rocker-arm H on its axis in the manner before stated, and thereby engage the idler-gears carried by the rocker-arm severally with the gear-wheels $c$ $c'$ $c^2$ $c^3$ or swing the arm into its intermediate position. It will be furthermore obvious that if the lever $O^2$ be swung horizontally it will act to rock or rotate the head J and shaft I in the bearing-sleeve $k$. The rotation of said shaft I acts, through the wheel I' and the rack-sleeve $I^2$, to shift the series or groups of main shaft-gears $c$ to $c^3$, inclusive, in the manner before stated to progressively bring such gears in line with the idler-gears of the rocker-arm.

Means are provided for locking the shaft from endwise and rotative movement after it has been adjusted to produce a desired speed of the power-transmitting shaft of the device—the counter-shaft—as herein shown. Said locking means are made as follows: The head J is provided on one side thereof with a plurality of parallel longitudinal grooves $j'$ $j^2$ $j^3$ $j^4$ of progressively-increasing lengths. Said grooves are intersected by a transversely-curved groove $j^5$, extending from the shorter groove $j'$ to the longer groove $j^4$. Said transversely-curved groove intersects said longitudinal grooves at the centers thereof, so that each of said longitudinal grooves extend equal distances above and below the transverse groove. Said transverse and longitudinal grooves are made of the same depth, and the lower ends of the longitudinal grooves are provided with generally cylindric recesses $j^6$. Coöperating with said grooves and recesses is a longitudinally-reciprocating latch-bar P, which has bearing in a suitable sleeve K' and shown herein as formed integral with an arm $k'$, that extends downwardly from the plate or bracket K. The outer end of said lock-bar is pivotally connected with a lever P', that is affixed to the lower end of a rod P², which has bearing in a sleeve K², formed integral with the bracket or plate K. The shaft P² is held in its bearing-sleeve by means of a ring $p$, attached to the upper end thereof by means of a pin $p'$ and located above and bearing on the upper end of the sleeve K². Said latch-bar P is adapted to enter either one of the longitudinal grooves $j'$ $j^2$ $j^3$ $j^4$ to lock the head and shaft from angular movement. The bar also coöperates with said grooves to hold the head and shaft in an adjusted vertical position. If the head is in its lower position, the end of the latch-bar engages the upper end wall of the longitudinal locking-groove which it occupies and locks the head and shaft from further downward movement. If, on the other hand, the head and shaft are adjusted to their uppermost position, they are held in such position by engagement of the inner end of the latch-bar with the recess $j^6$ of the longitudinal groove occupied by said latch-bar. Such upper and lower adjustments of the head and shaft tilt the rocker-arm to one or the other extreme of its movement, with one or the other of its idlers $h^4$ $h^5$ engaged with one of the main-shaft gears $c$ to $c^3$, inclusive. The head is shifted to an intermediate position to swing the rocker-arm H to its intermediate position, and the parts are held in such position by engagement of the inner end of the latch-bar with the parts of the upper wall of the transverse groove $j^5$ between the longitudinal groove. With this construction when it is desired to rotate the shaft I in order to shift endwise the group of gears $c$ to $c^3$, inclusive, the lever O² is first swung vertically on its pivot in order to bring the transversely-curved slot $j^5$ in line with the latch-bar P. If the latch-bar should at this time be engaged with the recesses $j^6$ at the lower end of the longitudinal groove, said latch-bar is disengaged by means of the lever P'. After the transversely-curved groove is brought into line with the latch-bar the head is rocked by the lever O² an angular distance to bring the desired gear-wheels $c$ to $c^3$, inclusive, in line with the idlers on the rocker-arm. It will be observed that there are as many longitudinal locking-grooves in the head J as there are gears in said group, and one of said grooves is appropriated to each gear. When, therefore, in the angular movement of the head the slot appropriated to one of the main-shaft gear-wheels has been brought into line with the latch-bar, the head and shaft are raised or lowered, as may be necessary, to bring the proper idler-gear of the rocker-arm into operative relation with the desired gear-wheels $c$ to $c^3$, inclusive. The engagement of said longitudinal grooves, therefore, not only locks the shaft I from angular movement and vertical movement, but also locks them in any adjusted position to effect the desired variation of speed.

It will be observed that the gears $d'$ $d^2$ may be considered a single or cone gear having two sets of peripheral teeth located at different distances from the axes thereof and that the gears $h^3$ $h^4$ may be similarly regarded, or said gears may be made separate from each other and fastened to the shaft D and stud $h'$, respectively, by separate means. Furthermore, the gears $c$ $c'$ $c^2$ $c^3$ have been herein variously termed "individual gear-wheels" of varying diameter, or collectively a "cone-gear," the latter term being hereinafter employed in certain of the claims. Such designations are not intended to impose limitations on the construction, inasmuch as this feature of the invention may assume somewhat different forms from that herein shown and may coact with the companion gears of the rocker-arm differently within the scope of the invention as set forth in the claims.

I claim as my invention—

1. In a change-speed gear, two rotative shafts, varied-diameter, closely-spaced gears carried by each of said shafts, one group of which is movable relatively to the other endwise of said shaft, a rocker-arm rockingly mounted independently of said shafts and gears carried by said rocker-arm for transmitting motion from one set of varied-diameter gears to the other, for the purpose set forth.

2. In a change-speed gear, two rotative shafts, a plurality of closely-grouped, varied-diameter gears on one of said shafts, diversely-sized gears on the other shaft, a rocker-arm having a rocking bearing independently of the latter shaft, and gears carried by said rocker-arm designed to transmit motion from the gears of one shaft to the gears of the other shaft, the variable-diameter gears of one of the shafts and said rocker-arm and the diversely-sized gears of the other shaft having relative movement endwise of the shafts, for the purpose set forth.

3. In a change-speed gear, two parallel, rotative shafts, a plurality of closely-grouped varied-diameter gears fixed non-rotatively to and sliding endwise on one of said shafts, diversely-sized gears fixed to the other shaft, a rocker-arm having bearing independently of the second shaft, and gears carried by said rocker-arm designed to transmit motion from the gears of one shaft to those of the other, for the purpose set forth.

4. In a change-speed gear, two parallel, rotative shafts, a plurality of closely-grouped, varied-diameter gears fixed non-rotatively to and sliding endwise on one of said shafts, diversely-sized gears on the other shaft, a rocker-arm having bearing independently of the latter shaft, and gears carried by said rocker-arm designed to transmit motion from the gears of one shaft to those of the other for the purpose set forth, combined with means for rocking said arm and for moving said varied-diameter gears endwise of their shaft.

5. In a change-speed gear, two parallel rotative shafts, a plurality of closely-grouped, varied-diameter gears mounted to rotate with and slide endwise on one of said shafts, diversely-sized gears fixed to the other shaft, a rocker-arm and gears on the rocker-arm for transmitting motion from the gears on one shaft to those on the other for the purpose set forth, combined with means for shifting said varied-diameter gears on their shaft.

6. A change-speed gear comprising a casing or support, a shaft rotatively mounted therein, a plurality of closely-grouped, varied-diameter gears mounted on said shaft, a rocker-arm rotatively mounted in said support, a second shaft rotatively mounted at one end in said support and at its other end in said rocker-arm, diversely-sized gears mounted on said second shaft, and gears carried by the rocker-arm for transmitting motion from the gears of one shaft to those of the other shaft for the purpose set forth, the varied-diameter gears of one shaft and the rocker-arm and the diversely-sized gears of the other shaft having relative movement endwise of said shafts.

7. A change-speed gear comprising a casing or support, a shaft rotatively mounted therein, a plurality of varied-diameter, closely-spaced gears mounted non-rotatively on and movable endwise of said shaft, a rocker-arm mounted in said support, a second shaft mounted at one end in said support and at its other end in said rocker-arm, and gears on said rocker-arm for transmitting motion from the gears of one shaft to those of the other for the purpose set forth.

8. A change-speed gear comprising two parallel shafts, a cone-gear rotative with and movable endwise on one of said shafts, a rack-and-gear mechanism for shifting said cone-gear endwise of its shaft, two gears of different diameters affixed to the other shaft, a rocker-arm, two rotative gears mounted one on each end of said rocker-arm in alinement with each other and adapted to be brought alternately into mesh with the cone-gear, a second gear rotating with one of said gears of the rocker-arm, the gear at one end of the rocker-arm meshing directly with one of the gears of the second shaft, and the corresponding gear at the other end of said rocker-arm being driven from the second gear of the second shaft through said second or associated gear.

9. A change-speed gear comprising two parallel shafts, a cone-gear rotative with and movable endwise of one of said shafts, two gears of different diameters fixed to the other shaft, a rocker-arm, two rotative gears mounted one on each end of said rocker-arm in alinement with each other and adapted to be brought alternately into mesh with the cone-gear, a second gear rotating with one of said gears of the rocker-arm, one of said gears of the rocker-arm meshing directly with one of the gears of the second shaft and the second gear of the said rocker-arm being driven from the other gear of the second shaft by the said gear rotating therewith, and a single manually-operable part constructed to swing said rocker-arm on its axis and to shift the movable gears on their shaft.

10. In a change-speed gear, two rotative shafts, varied-diameter, closely-grouped gears carried by each shaft, one group of which is movable relatively to the other endwise of said shafts, a rocker-arm mounted independently of said shafts and gears carried by said rocker-arm for transmitting motion from one set of gears to the other for the purpose set forth, combined with means for rocking said arm and for effecting shifting of said movable gears.

11. A change-speed gear comprising a main shaft, a plurality of gears of varying diameters affixed to and movable endwise thereof, a counter-shaft parallel with the main shaft, two gears of different diameters fixed to the counter-shaft, a rocker-arm, a single idler mounted on one end of said arm, two connected idlers mounted on the other end of said rocker-arm, and a single controlling device for rocking said arm about its axis of oscillation and shifting the gears of varying diameters along their shaft.

12. A change-speed gear comprising a main shaft, a plurality of gears of varying diameters affixed to and movable endwise thereof, a counter-shaft parallel with the main shaft, two gears of different diameters fixed to the counter-shaft, a rocker-arm, a single idler mounted on one end of said rocker-arm, two connected idlers mounted on the other end of said rocker-arm, said single idler and one of the connected idlers having constant meshing engagement with the gears of the counter-shaft, and a single manually-operable part acting to swing said rock-shaft on its axis of oscillation to bring said idlers alternately in mesh with the main-shaft gears, and to shift said plurality of gears endwise of said main shaft.

13. A change-speed gear comprising two rotative shafts, a cone-gear fixed non-rotatively to and sliding endwise on one shaft, a gear fixed to the other or second shaft, a rocker-arm, idler-gears carried by the outer ends of said arm and in constant mesh with the gear of the second shaft, and means for rocking said arm to bring the idler-gears thereof alternately in mesh with the cone-gears, comprising a segmental gear on said arm and an endwise-movable rack meshing therewith.

14. A change-speed gear comprising two rotative shafts, a cone-gear fixed non-rotatively to and sliding endwise on one shaft, a gear fixed to the other or second shaft, a rock-arm, idler-gears carried by the outer ends of said arm and in constant mesh with the gear of the second shaft, and means for rocking said arm to bring the idler-gears thereof alternately in mesh with the cone-gear, and for moving the cone-gear endwise of its shaft, comprising a segmental gear on said arm, an endwise-movable, rotative shaft provided with an annular rack adapted for engagement with said segmental gear, a gear-wheel fixed to said shaft, a sliding rack meshing with said gear, and connections between said rack and cone-gear.

15. A change-speed gear comprising a main shaft, a plurality of gears of varying diameters affixed to and movable endwise thereof, a counter-shaft parallel with the main shaft, two gears of different diameters fixed to the counter-shaft, a rocker-arm, a single idler mounted on one end of said rocker-arm, two connected idlers mounted on the other end of said arm, said single idler and one of the connected idlers being in constant mesh with the gears of the counter-shaft, and a single manually-operable part operating to swing said rocker-arm to bring the two opposing idlers on the rocker-arm alternately into mesh with the gears of the main shaft and to shift said latter gears endwise of the main shaft, comprising a segmental gear on the rocker-arm, a rotative, endwise-sliding shaft provided with a circular rack engaging said segmental gear, a gear-wheel on said sliding shaft, and a sliding rack meshing with said latter gear-wheel and connected with said gears of the main shaft.

16. A change-speed gear comprising a main shaft, a plurality of gears of varying diameters affixed to and movable endwise thereof, a counter-shaft parallel with the main shaft, two gears of different diameters affixed to the counter-shaft, a rocker-arm, a single idler mounted on one end of said rocker-arm, two connected idlers mounted on the other end of said arm, said single idler and one of the connected idlers having constant meshing engagement with the gears of the counter-shaft, and said single idler and the other of the connected idlers being adapted for alternate meshing engagement with the gears of the main shaft, a gear-segment on said rocker-arm, an endwise-sliding, rotative shaft provided with an annular rack adapted for engagement with the gear-segment of the rocker-arm, a shaft parallel with said main shaft, a sleeve thereon provided with a rack, a gear affixed to said sliding shaft and meshing with said rack of the sleeve and interlocking connections between said rack-sleeve and said group of gears of the main shaft.

17. In a change-speed gear of the character described, the combination with the oscillating rocker-arm, a gear-segment thereon, and an endwise-sliding rack which moves in a direction parallel with the axis of oscillation of the rocker-arm, of a rotative and endwise-sliding shaft, an annular rack on said shaft adapted for engagement with the gear-segment of the rocker-arm and a gear-wheel on said shaft adapted for engagement with said sliding rack.

18. In a change-speed gear of the character described, the combination with the oscillating rocker-arm, a gear-segment thereon, and an endwise-sliding rack which moves in a direction parallel with the axis of oscillation of the rocker-arm, of a rotative and endwise-sliding shaft, an annular rack on said shaft adapted for engagement with the gear-segment of the rocker-arm, a gear-wheel also on said shaft adapted for engagement with said sliding rack, means at the lower end of said shaft for raising and lowering the shaft, means for rotating the shaft upon its axis, and locking means for holding the said shaft in an adjusted angular and raised or lowered positions.

19. In a change-speed gear of the character described, the combination with the oscillating rocker-arm, a gear-segment thereon, and an endwise-sliding rack which moves in a direction parallel with the axis of oscillation of the rocker-arm, of a rotative and endwise-sliding shaft, an annular rack on said shaft adapted for engagement with the gear-segment of the rocker-arm, and a gear-wheel also on said shaft adapted for engagement with said sliding rack, a head at the lower end of said shaft, a rack on said head, a lever pivoted to a stationary part, a gear-segment on said lever meshing with said rack of the head, means for turning said head and shaft, and means for locking the shaft in an adjusted angular and upper or lower positions.

20. In a change-speed gear of the character described, the combination with the oscillating rocker-arm, a gear-segment thereon, and an endwise-sliding rack which moves in a direction parallel with the axis of oscillation of the rocker-arm, of a rotative and endwise-sliding shaft, an annular rack on said shaft adapted for engagement with the gear-segment of the rocker-arm, a gear-wheel also on said shaft adapted for engagement with the said sliding rack, a stationary bearing in which the lower end of the endwise-sliding shaft is mounted, a head on the shaft beneath said bearing, a rack on said head, a lever pivotally mounted in an arm depending from the bearing, a gear-segment on said lever meshing with said latter rack, whereby the shaft may be raised and lowered, said bearing being made of two parts, one of which, carrying said depending arm, is rotative with respect to the other part, whereby the head and shaft may be turned through the medium of said lever, and means for locking said head and shaft in an adjusted angular and upper or lower positions.

21. In a change-speed gear of the character described, the combination with the oscillating rocker-arm, a gear-segment thereon and an endwise-sliding rack which moves in a direction parallel with the axis of oscillation of the rocker-arm, of a rotative and endwise-sliding shaft, an annular rack on said shaft adapted for engagement with the gear-segment of the rocker-arm, a gear-wheel also on said shaft adapted for engagement with said sliding rack, a stationary bearing in which the lower end of said shaft is mounted, a head on the shaft beneath said bearing, a rack on said head, a lever pivotally mounted in an arm depending from the bearing, a gear-segment on said lever which meshes with the rack on said head whereby the shaft may be raised and lowered, said bearing being made of two parts, one of which, carrying said depending arm, is rotative with respect to the other part, whereby the head and shaft may be turned through the medium of said lever, and means for locking said head and shaft in an adjusted angular and upper or lower positions, including a plurality of longitudinal grooves of varying lengths, in said head, and provided at their lower ends with recesses, and a latch adapted to enter severally said grooves and engage either of said recesses or the upper end walls of the grooves.

22. In a change-speed gear of the character described, the combination with the oscillating rocker-arm and the endwise-sliding rack which moves in a direction parallel with the axis of oscillation of the rocker-arm, of a rotative and endwise-sliding shaft, an annular rack on said shaft adapted for engagement with the gear-segment of the yoke, a gear-wheel also on said shaft adapted for engagement with said sliding rack, a stationary bearing in which the lower end of the said shaft is mounted, a head on the shaft beneath said bearing, a rack on said head, a lever pivotally mounted in an arm depending from the bearing, a gear-segment on said arm which meshes with the rack on said head, whereby the shaft may be raised and lowered, said bearing being made of two parts, one of which, carrying said depending arm, is rotative with respect to the other part, whereby the head and shaft may be turned through the medium of said lever, and means for locking said head and shaft in an adjusted angular and upper or lower positions comprising a plurality of longitudinal grooves of varying lengths in said head provided at their lower ends with recesses, a latch adapted to enter severally said grooves and engage either said recesses or the upper end walls of the grooves, and a transversely-curved groove centrally intersecting the longitudinal grooves and located in position to receive said latch when the head and shaft are at the intermediate part of their longitudinal movement.

23. A change-speed gear comprising two rotative shafts, a cone-gear fixed non-rotatively to and sliding endwise on one shaft, a gear fixed to the other or second shaft, a rock-arm, idler-gears carried by the outer ends of said arm and in constant mesh with the gear of the second shaft, means for rocking said arm to bring the idler-gears thereof alternately in mesh with the cone-gear and for moving the cone-gear endwise of its shaft, comprising a segmental gear on the rocker-arm, an endwise-sliding, rotative shaft, an annular rack on said shaft adapted for engagement with said segmental gear, a gear-wheel fixed to said shaft, a sliding rack meshing with said gear-wheel and connected with the cone-gear, a head at the lower end of said endwise-movable and rotative shaft, means for raising and lowering said head and shaft and for rotating the same, and means for locking said parts in an adjusted position, comprising a plurality of longitudinal grooves in said head, equal in number to the geared parts of said cone-gear, and of progressively-increasing length, said grooves being provided at their lower ends with recesses and a latch adapted to enter severally said grooves to prevent rotation of the head and to engage said recesses of the grooves or the upper end walls of the grooves to hold the head in its upper or lowermost position.

In testimony that I claim the foregoing as my invention I affix my signature, in presence of two witnesses, this 23d day of November, A. D. 1904.

ALBERT W. WIGGLESWORTH.

Witnesses:
 HARRY W. MONS,
 R. B. SHAW.